United States Patent
Saluja

(10) Patent No.: US 8,644,464 B1
(45) Date of Patent: Feb. 4, 2014

(54) METHOD AND SYSTEM FOR CREATING A CUSTOMIZED AUDIO SNIPPET

(71) Applicant: Veena Kumari Saluja, Welwyn Garden (GB)

(72) Inventor: Veena Kumari Saluja, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/623,889

(22) Filed: Sep. 21, 2012

(51) Int. Cl.
*H04M 11/00* (2006.01)

(52) U.S. Cl.
USPC .......................................... 379/88.14; 379/68

(58) Field of Classification Search
USPC ............ 379/88.14, 207.16, 87; 704/277, 246; 455/563
See application file for complete search history.

(56) References Cited

U.S. PATENT DOCUMENTS

| | | | |
|---|---|---|---|
| 7,130,801 B2 * | 10/2006 | Kitahara et al. | 704/277 |
| 7,962,129 B2 | 6/2011 | Small et al. | |
| 2008/0161057 A1 * | 7/2008 | Nurminen et al. | 455/563 |
| 2008/0215323 A1 * | 9/2008 | Shaffer et al. | 704/246 |
| 2009/0185669 A1 | 7/2009 | Zitnik et al. | |
| 2009/0220067 A1 * | 9/2009 | Leeds | 379/207.16 |
| 2011/0019804 A1 * | 1/2011 | Kovales et al. | 379/87 |

* cited by examiner

*Primary Examiner* — Mohammad Islam
*Assistant Examiner* — Van D Huynh
(74) *Attorney, Agent, or Firm* — O'Brien Jones, PLLC

(57) ABSTRACT

The disclosed embodiments related to a method and system for creating an audio snippet. The method includes receiving a call from a calling party on a communication device. The method further includes recording a first audio of the calling party at the communication device. The method further includes creating the audio snippet by using the first audio of the calling party and, one or more pre-stored second audio on the communication device on the basis of one or more techniques.

20 Claims, 2 Drawing Sheets

METHOD AND SYSTEM FOR CREATING A CUSTOMIZED AUDIO SNIPPET

TECHNICAL FIELD

The presently disclosed embodiments are related to a method and system for creating an audio snippet. More particularly, the presently disclosed embodiments are related to a method and system for creating an audio snippet configured to be used as a ringtone in wired and wireless communication devices to alert a recipient of incoming calls.

BACKGROUND

Mobile phones have become a platform for expressing individual personalities through varied ringtones. This has created a new market need for individualized ringtones, and the mobile phone owners can download ringtones of favorite songs from a variety of providers at pre-defined prices. These customizable ringtones have gained much popularity as they allow users to set a specific ringtone to be played when receiving a call from a specific person.

Though a multitude of customization options exist for the creation of ringtones, these options only facilitate the identification of the calling party to the user and do not provide any additional information pertaining to the caller.

SUMMARY

According to the embodiments illustrated herein, a method for creating an audio snippet has been provided. The method includes receiving a call from a calling party on a communication device and recording a first audio of the calling party at the communication device. The method further includes creating the audio snippet by using the first audio of the calling party and, one or more pre-stored second audio on the communication device based on one or more techniques.

According to the embodiments illustrated herein, a system for creating an audio snippet has been provided. The system includes a transceiver module and a production module. The transceiver module is configured to receive and record a first audio of a calling party on a communication device. The production module is configured to create the audio snippet by using the first audio of the calling party and one or more pre-stored second audio on the communication device based on one or more techniques.

According to the embodiments illustrated herein, a computer program product for use with a computer for creating an audio snippet has been provided. The computer readable program code includes program instruction means for receiving a call from a calling party on a communication device. The computer readable program code further includes program instruction means for recording a first audio of the calling party at the communication device. The computer readable program code further includes program instruction means for creating the audio snippet by using the first audio of the calling party and, one or more pre-stored second audio on the communication device based on one or more techniques.

BRIEF DESCRIPTION OF DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and description set forth herein. Various embodiments have been discussed below with reference to the figures. However, those skilled in the art will readily appreciate that the detailed descriptions given herein with respect to the figures are simply for explanatory purposes, as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meaning set forth below.

A "communication device" refers to telecommunication devices such as a cellular phone, pager, PDA, laptop, and personal computer. The communication device may be a wireless cellular telephone, a personal communicator, a landline telephone, or a portable music-player equipped with communicative abilities.

An "audio snippet" is a ringtone played to alert the user of a communication device of an incoming phone call or other type of communication (such as SMS, email etc.). The audio snippets are typically stored as digital audio files on the communication device such as a mobile phone.

The term "called party" and "user" are interchangeably used.

Figure 1:
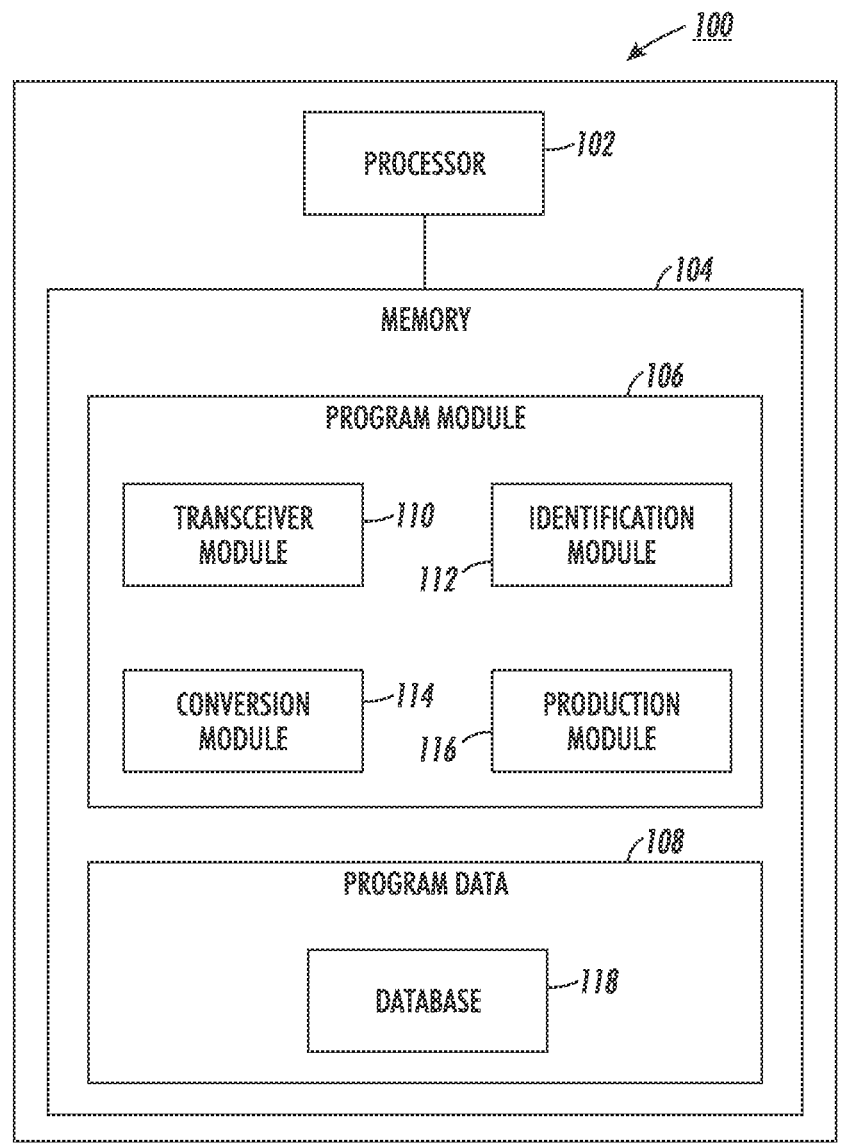
FIG. 1 is a block diagram illustrating a system for creating an audio snippet in accordance with at least one embodiment.

FIG. 1 is a block diagram illustrating a system 100 for creating an audio snippet in accordance with at least one embodiment.

The system 100 includes a processor 102 and a memory 104. The processor 102 is attached to the memory 104. In an embodiment, the system 100 corresponds to a computing device, such as a Personal Digital Assistant (PDA), a Smartphone, a tablet PC, a laptop, a personal computer, a mobile phone, a Digital Living Network Alliance (DLNA)-enabled device, or the like.

The processor 102 is configured to execute a set of instructions stored in the memory 104 to perform one or more operations. The processor 102 fetches the set of instructions from the memory 104 and executes the set of instructions. The processor 102 can be realized through a number of processor technologies known in the art. Examples of the processor include an X86 processor, a RISC processor, or an ASIC processor. In an embodiment, the processor 102 includes a Graphics Processing Unit (GPU) that executes the set of instructions to perform one or more processing operations.

The memory 104 is configured to store the set of instructions or modules. Some of the commonly known memory implementations can be, but are not limited to, a random access memory (RAM), a read-only memory (ROM), a hard disk drive (HDD), and a secure digital (SD) card. The memory 104 includes a program module 106 and a program data 108. The program module 106 includes a set of instructions that can be executed by the processor 102 to perform specific actions on the system 100. The program module 106 also includes a transceiver module 110, an identification module 112, a conversion module 114, and a production module 116.

The program data 108 includes a database 118. The database 118 is a storage medium that stores the data submitted from and/or required by the transceiver module 110, the identification module 112, the conversion module 114, and the production module 116. In an embodiment, the database 118 can be implemented using technologies, including, but not limited to, Oracle®, IBM DB2®, Microsoft SQL Server®, Microsoft Access®, PostgreSQL®, MySQL®, and SQLite®.

The transceiver module 110 is configured to receive the first audio of a calling party on a communication device. In an embodiment, a called party receives an incoming call on its communication device from a called party. The communication device refers to telecommunications devices such as a cellular phone, pager, PDA, laptop, and personal computer. The communications device may also be a wireless cellular telephone, a personal communicator, or a landline-based telephone. In an embodiment, the communication device may transmit and receive calls via various communication platforms such as a private branch exchange, cellular platform, and voice-over-IP platform. It will also be apparent to a person having ordinary skill in the art that the communication device can also be associated with any other wired or wireless phone network. The network may be a small private local network, switched telephone network, or the Internet.

In response to the incoming call on the communication device of the called party, upon receipt of the incoming call, the transceiver module 110 records a first audio of the calling party. In an embodiment, the transceiver module 110 automatically records the first audio of the calling party. In another embodiment, the called party initiates the recording of the first audio. The called party may initiate the recording manually or by pre-selecting a recording setting on the communication device. The recording of the first audio of the calling party may be initiated while receiving the incoming call or anytime during the conversation between the calling party and the called party. In an embodiment, the first audio is preferably recorded in a digital audio format such as MP3, WMA, or AAC.

In accordance with another embodiment, the transceiver module 110 may be configured to record the conversation between the calling party and the called party on the communication device. The called party initiates the recording of the conversation between the calling party and the called party by the transceiver module 110. Thereafter, the transceiver module 110 facilitates the breaking of the recorded conversation between the calling party and the called party into two sets, wherein at least one set of the two sets includes the first audio of the calling party. In an embodiment, the transceiver module 110 may implement various computer programs to break the recorded conversation between the calling party and the called party into two sets. The audio breaking computer program is so chosen that there is no impact on the quality of the audio while breaking a larger audio file into smaller files.

In an embodiment, the first audio recorded may include the first or last moments of the conversation between the calling party and the called party, or a randomly selected portion of the conversation between the calling party and the called party. In another embodiment, the first audio recorded may include the voice of the calling party.

The transceiver module 110 is further configured to establish and maintain communication with the identification module 112. The transceiver module 110 transmits the first audio to the identification module 112 for language identification of the first audio. The identification module 112 identifies the language of the first audio of the calling party. In an embodiment, the identification module 112 may use any suitable technique for automatic language identification of the first audio. In one embodiment, the technique used to identify the language of the first audio may include a set of libraries providing access to the core languages and a training application tool for creating language identification models.

After the identification of the language of the first audio, the identification module 112 may also be configured to modify the identified language of the first audio into any other desired language. The identification module 112 may use any suitable language translation technique in order to change or modify the language of the first audio into any other desired language.

The conversion module 114 is configured to receive a text (in the form of an SMS, MMS etc) from a calling party. After receiving the text, the conversion module 114 facilitates the conversion of the text into a speech. In another embodiment, the conversion module 114 may convert the documents to speech, or web content to speech, or blogs to speech.

In an embodiment, the conversion module 114 includes a text-to-speech engine for receiving the source text from the called party and converting the source text into speech data. In one embodiment, the text-to-speech engine may be included in the central processing unit (CPU), and may use a system processor to perform the text-to-speech conversion. In another embodiment, the text-to-speech engine may be based on the digital signal processing (DSP) platform. In another embodiment, the conversion module 114 receives the source text from the calling party and converts into speech data.

The conversion module 114 first compares the text received from the called party or the user of the communication device to a dictionary. If the text is not found in the dictionary, the conversion module 114 will apply the standard pronunciation rules to the text word. Thereafter, the text word is converted to a phoneme sequence. By using the look-up tables contained in a phoneme and transition matrix, any suitable synthesizer can translate the sequence of phonemes and transitions into sequences of speech segments. The sequences of the speech segments are capable of being expressed in terms of repetitions of variable-length portions of short digitally stored waveforms.

The production module 116 is configured to create an audio snippet by using the first audio of the calling party and one or more pre-stored second audio on the communication device based on one or more techniques. The one or more pre-stored second audio may contain music or other sounds. The created audio snippet is subsequently played as a ringtone on the communication device when receiving an incoming call from the same calling party.

In an embodiment, the first audio may be initially processed by applying sound effects. After the initial processing of the first audio, it is subsequently mixed or combined with the one or more pre-stored second audio. The second audio may be a speech (converted from text by the conversion module 114), a phrase, a story, a poem, or a song. The mixing of the first and the second audio create an audio snippet that may be used as a ringtone. The audio snippet created is such that the second audio matches the voice of the calling party present in the first audio.

In yet another embodiment, the production module 116 may generate an audio snippet by using the one or more second audio and the voice messages left by the calling party on the communication device of the called party. The production module 116 is further configured to search the calling party voice messages on the communication device of the called party, and subsequently alert the called party if the searched voice message matches with any pre-stored voice messages of the same calling party.

The mixing or combining of the first and the second audio is performed by one or more techniques. In an embodiment, in one of the techniques, the first audio is decoded by any suitable audio decoder implemented in the production module 116 to decode data of the first audio into a format that is capable of mixing with the second audio. The second audio may also be decoded by any suitable audio decoder or a suitable synthesizer configured to synthesize the second audio into a mixable audio format.

In an embodiment, to achieve the mixing of the first and the second audio, the amplitude of the first and the second audio may be varied and adjusted. Such adjustment in the amplitude of the first and the second audio may result in the avoidance of the unwanted audio effects while mixing.

In an embodiment, the audio snippet created by using the first audio of the calling party and the second audio is such that the listener can differentiate between the sounds of the first and the second audio while listening to the audio snippet. In another embodiment, while creating the audio snippet, one of the first or the second audio may be attenuated with respect to each other so that the overall audio snippet sounds as a single piece of audio.

In an embodiment, to create an audio snippet, the production module 116 will facilitate placing of the first and the second audio into a mixable format. The mixing may further include synthesis, decompression, decoding, or other processing of each of the first and the second audio.

Initially, the first and the second audio may be present in a non-mixable audio file formats. In such a case, the first and the second audio are synthesized to be mixed. In an embodiment, the mixable format of the first and the second audio may contain a set of digital musical instructions that can be interpreted by the processor and synthesized into a mixable audio format.

In another embodiment, the non-mixable audio file formats of the first and the second audio may include the compressed audio formats such as MP3. The compressed audio formats may require processing before presenting it to a mixer or digital-to-analog converter. In yet another embodiment, the non-mixable audio file formats of the first and the second audio may include coded audio formats such as GSM. These non-mixable files are thereafter converted into an audio format that can be more easily mixed within an electronic device.

After the creation of the audio snippet, the production module 116 transcodes the audio snippet into a format, which can be played on a communication device. Thereafter, the production module 116 sends a preview of the audio snippet to the called party or the user of the communication device, which can be later stored on the communication device upon the instructions of the called party or the user of the communication device.

Figure 2:
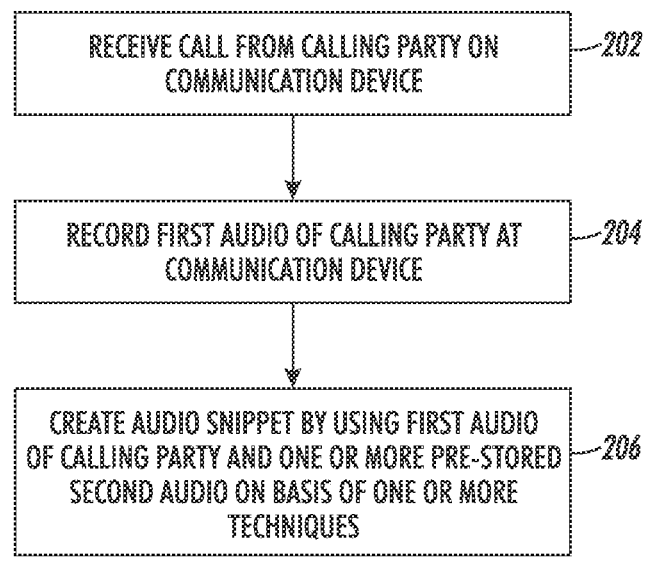
FIG. 2 is a flow diagram illustrating a method for creating an audio snippet in accordance with at least one embodiment.

FIG. 2 is a flow diagram illustrating a method for creating an audio snippet in accordance with at least one embodiment.

At step 202, in an embodiment, a call is received from the calling party on the communication device. Upon receiving the incoming call, the called party receives a first audio of a calling party on the communication device. This is further explained in detail in conjunction with FIG. 1.

At step 204, in an embodiment, the first audio of the calling party is recorded at the communication device by the transceiver module 110. The recording of the first audio may be initiated automatically or manually by the called party upon or after receiving the incoming call on the communication device. Subsequent to the recording of the first audio, the called party has the option to either save or discard the first audio recorded of the calling party. In an embodiment, when the called party saves the first audio on the communication device, the transceiver module 110 analyzes the audio pattern and duration of the first audio. This is further explained in detail in conjunction with FIG. 1

At step 206, the production module 116 creates an audio snippet by using the first audio of a calling party and one or more pre-stored second audio on the basis of one or more techniques. The created audio snippet is subsequently played as a ringtone when receiving the incoming call from the same calling party. This is further explained in conjunction with FIG. 1.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product for creating an audio snippet, as described above, have various advantages. The disclosed method and system enable the creation of audio snipetts is useful to recognize and identify the caller without looking at the phone, for example, when the called party is driving. It may also be useful for visually impaired as they can hear and recognize the calling party voice which may help in deciding if they want to answer or not.

Various embodiments of the method and system for creating for creating the audio snippet have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules, and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many different systems or applications. Various presently unforeseen or unanticipated alternatives, modifications, variations, or improvements therein may be subsequently made by those skilled in the art, which are also intended to be encompassed by the following claims.

What is claimed is:

1. A method for creating an audio snippet, the method comprising:
   receiving a call from a calling party on a communication device;
   recording a first audio of the calling party at the communication device;
   receiving a text message from the calling party and converting the text message into a second audio, wherein the received text is not a conversion of the first audio;
   creating the audio snippet by using the first audio, the second audio, and at least a portion of a voice message left by the calling party on the communication device on the basis of one or more techniques, wherein a voice in the portion of the voice message matches to a voice of the calling party present in the first audio, wherein the voice message is left before or after the received call.

2. The method of claim 1 further comprising storing the audio snippet on the communication device of a called party.

3. The method of claim 1, wherein the voice message comprises at least one of a speech, a phrase, a story, a poem, or a song.

4. The method of claim 1 further comprising analyzing an audio pattern of the first audio at the communication device of a called party.

5. The method of claim 1 further comprising sending a preview of the audio snippet to a called party.

6. The method of claim 1 further comprising transcoding the audio snippet into a format capable of being played at the communication device.

7. The method of claim 1 further comprising identifying a language of the first audio of the calling party automatically.

8. The method of claim 7 further comprising modifying the identified language of at least one of the first audio or the one or more second audio.

9. The method of claim 1, wherein the audio snippet is configured to be used as a ringtone on the communication device.

10. The method of claim 1, wherein the recording of the calling party at the communication device is initiated by the called party.

11. A system for creating an audio snippet, the system comprising:
    a transceiver module configured for:
       receiving a first audio of a calling party on a communication device; and
       recording the first audio of the calling party on the communication device;
    a conversion module configured for receiving a text message from the calling party and converting the text message into a second audio, wherein the received text is not a conversion of the first audio; and a production module configured for creating the audio snippet by using the first audio, the second audio, and at least a portion of a voice message left by the calling party on the communication device on the basis of one or more techniques, wherein a voice in the portion of the voice message matches to a voice of the calling party present in the first audio, and wherein the voice message is left before or after the received call.

12. The system of claim 11 further comprising an identification module configured for automatically identifying a language of at least one of the first audio of the calling party, or one or more second audio.

13. A computer program product for use with a computer, the computer program product comprising a non-transitory computer readable data carrier storing a computer-readable program code for creating an audio snippet, the computer-readable program code comprising:
   program instruction means for receiving a call from a calling party on a communication device;
   program instruction means for recording a first audio of the calling party at the communication device;
   program instruction means for receiving a text message from the calling party and converting the text message into a second audio, wherein the received text is not a conversion of the first audio;
   program instruction means for creating the audio snippet by using the first audio, the second audio, and at least a portion of a voice message left by the calling party on the communication device on the basis of one or more techniques, wherein a voice in the portion of the voice message matches to a voice of the calling party present in the first audio, and wherein the voice message is left before or after the received call.

14. The computer program product of claim 13 further comprising program instruction means for storing the audio snippet on the communication device of a called party.

15. The computer program product of claim 13 further comprising program instruction means for analyzing an audio pattern of the first audio at the communication device of a called party.

16. The computer program product of claim 13 further comprising program instruction means for sending a preview of the audio snippet to a called party.

17. The computer program product of claim 13 further comprising program instruction means for optimizing the first audio prior to using it for the creation of the audio snippet.

18. The computer program product of claim 13 further comprising program instruction means for selecting a text for creating the audio snippet, where the text is converted into a speech prior to creating the audio snippet.

19. The computer program product of claim 13 further comprising program instruction means for identifying a language of the first audio of the calling party automatically.

20. The computer program product of claim 19 further comprising program instruction means for modifying the identified language of at least one of the first audio or, the one or more second audio.

* * * * *